(12) United States Patent
Wegner

(10) Patent No.: US 11,300,157 B2
(45) Date of Patent: Apr. 12, 2022

(54) SLIDING BEARING WITH ADDITIVELY-MANUFACTURED STRUCTURES

(71) Applicant: MAN Energy Solutions SE, Augsburg (DE)

(72) Inventor: Hanno Wegner, Schoenefeld/Grossziethen (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/751,566

(22) Filed: Jan. 24, 2020

(65) Prior Publication Data

US 2020/0240468 A1 Jul. 30, 2020

(30) Foreign Application Priority Data

Jan. 28, 2019 (DE) ...................... 10 2019 101 974.5

(51) Int. Cl.
| | | |
|---|---|---|
| *F16C 33/14* | (2006.01) | |
| *F16C 17/03* | (2006.01) | |
| *F16C 17/06* | (2006.01) | |
| *B33Y 80/00* | (2015.01) | |
| *B33Y 10/00* | (2015.01) | |

(52) U.S. Cl.
CPC .............. *F16C 33/14* (2013.01); *F16C 17/03* (2013.01); *F16C 17/06* (2013.01); *B33Y 10/00* (2014.12); *B33Y 80/00* (2014.12)

(58) Field of Classification Search
CPC .......... F16C 17/03; F16C 17/06; F16C 33/12; F16C 33/127; F16C 33/14; F16C 2220/20
See application file for complete search history.

(56) References Cited

U.S. PATENT DOCUMENTS 9,874,247 B2 * 1/2018 Wang ...................... F16C 17/03
10,436,252 B2 * 10/2019 Sanz ...................... B29C 64/112

FOREIGN PATENT DOCUMENTS

| AT | 507397 | 4/2010 |
|---|---|---|
| DE | 102007042382 | 4/2009 |
| DE | 102014209062 | 11/2014 |
| JP | H0525696 | 2/1993 |

OTHER PUBLICATIONS

Irawan, Daniel, "Sandwich Panel Composite Based Light-Weight Structure Design for Reserved Energy Storage System (RESS) Protections", Nov. 2019 (Year: 2019).*

* cited by examiner

*Primary Examiner* — James Pilkington
(74) *Attorney, Agent, or Firm* — Cozen O'Connor

(57) ABSTRACT

A sliding bearing for mounting a shaft with a bearing body and a bearing ring, which is formed from a multiplicity of tilting pads. The multiplicity of tilting pads and tiltably mounted on the bearing body and, with a sliding surface of the shaft, forms a lubricated bearing gap. At least one tilting pad and/or the bearing body has at least one functional structure located inside for forming a support region.

14 Claims, 3 Drawing Sheets

SLIDING BEARING WITH ADDITIVELY-MANUFACTURED STRUCTURES

BACKGROUND OF INVENTION

1. Field of the Invention

The invention relates to a sliding bearing for mounting a shaft. This sliding bearing can be formed with a bearing body and a single or a multiplicity of sliding surfaces, or with a bearing ring, which is formed from a multiplicity of tilting pads, and to a method for producing the bearing body and the tilting pads.

2. Description of Related Art

Radial and axial sliding bearings are employed as tilting pad bearings in different machines for applications at very high rotational speeds or axial loads to take into account the high rotation-dynamic requirements. Main applications are turbines, transmissions, turbo compressors, fans, and electric motors. In the prior art, the basic geometry of the bearing body and of the tilting pads is exclusively produced for this purpose with cutting methods such as chip machining or spark erosion. In this way, the external geometry of the bearing body and of the tilting pads is freely configurable but the internal geometry can only be adapted to the relevant requirements to a very limited degree and/or with very high cost and processing expenditure using the conventional manufacturing methods. Thus, a conventional tilting pad is produced as solid material with various small balls for the positioning and for the temperature measurement. A conventional bearing body is produced with various bores and function surfaces.

SUMMARY OF THE INVENTION

One aspect of the present invention is to overcome the aforementioned disadvantages and provide a bearing body or a tilting pad bearing or a method for producing bearing bodies or tilting pads for a sliding bearing for mounting a shaft which withstand the high mechanical requirements.

According to one aspect of the invention, a sliding bearing for mounting a shaft with a bearing body and a bearing ring, which is formed from a multiplicity of tilting pads, is therefore proposed. The multiplicity of tilting pads is tiltably mounted on the bearing body and, with a sliding surface of the shaft, forms a lubricated bearing gap. In addition to this, at least one tilting pad or/and the bearing body has at least one functional structure located inside (deviating from a solid material) for forming a support region. Advantageous in this is that this new tilting pad concept or bearing body concept provides a partly hollow internal contour provided with a specific support structure of at least one tilting pad or of the bearing body, which can also be designed in a highly complex manner Because of this, the bearing damping is adjustable via at least one tilting pad by a targeted change of the flow resistance and of the material damping of the pad and the friction processes in the tilting pad. Furthermore, the bearing rigidity can be adjusted through targeted structural rigidities of the support region in at least one tilting pad and/or the bearing body.

In an advantageous embodiment version it is provided that the support region located inside has a hollow space or a multiplicity of hollow spaces or structures that are open to the outside. By forming a hollow space or multiple hollow spaces in the support region located inside, the bearing rigidity and the bearing damping can be suitably adapted through at least one tilting pad and/or the bearing body and correspondingly adapted to the requirements of the bearing.

In a further development of the present sliding bearing according to one aspect of the invention it is provided, furthermore, that at least one tilting pad and/or the bearing body is at least partly produced by additive manufacturing. Advantageous in this is that at least one tilting pad and/or the bearing body, depending on requirements, can be produced either completely by the additive manufacturing or only the functional structure located inside be added from a blank of solid material, by way of which material, time and the production expenditure can be reduced.

Preferentially, the sliding bearing is designed so that the support region has a honeycomb-like structure.

In an exemplary embodiment of the invention it is provided that in the support region, longitudinally and/or transversely extending support webs are formed, which preferentially are connected to one another by way of connecting webs, so that a specific support structure is created. Instead of the formation of hollow spaces it is also conceivable to introduce a different material into the intermediate spaces by additive method.

Furthermore, an embodiment is favourable, in which the support region comprises arc-shaped support webs.

In this way, the functional structure located inside can be quite individually adapted to the respective requirements of the sliding bearing. The different configurations of the support region thus cover a multiplicity of application regions and their demands on the tilting pad and the bearing body.

In a further advantageous version it is provided that the tilting pads are coated with a sliding layer on an outer surface, which with the sliding surface of the shaft forms the lubricated bearing gap. Advantageous in this is that by the sliding layer an optimum lubrication of the sliding bearing is ensured and thus unnecessary friction losses avoided.

In an embodiment version, the sliding bearing according to one aspect of the invention is formed so that adjacent tilting pads between them form a gap that is suitable for conducting a lubricant. In this way, a conventional lubrication of the sliding bearing is ensured during the operation.

According to one aspect of the invention, a method for producing at least one tilting pad and/or the bearing body for a sliding bearing is proposed, furthermore, with which at least one tilting pad and/or the bearing body for forming the support region is produced by means of additive manufacturing, in particular by means of 3-D printing.

The additive manufacturing or a 3-D printing or the construction in layers by a sintering method provides an optimum possibility of producing a suitable tilting pad and/or the bearing body since the production process is subject only to the peripheral conditions of the production of the additive manufacturing and in this way at least one tilting pad and/or the bearing body can be formed correspondingly complex. The accessibility of tools to the internal geometry no longer has any influence and at least one tilting pad and/or the bearing body receives functional structures located inside according to the requirements.

Preferentially, the material for the additive manufacturing of the tilting pad and of the bearing body is metal or contains metal proportions.

BRIEF DESCRIPTION OF THE DRAWINGS

Other advantageous further developments of the invention are marked in the subclaims or are shown in more detail

DETAILED DESCRIPTION OF THE PRESENTLY PREFERRED EMBODIMENTS

Figure 1:
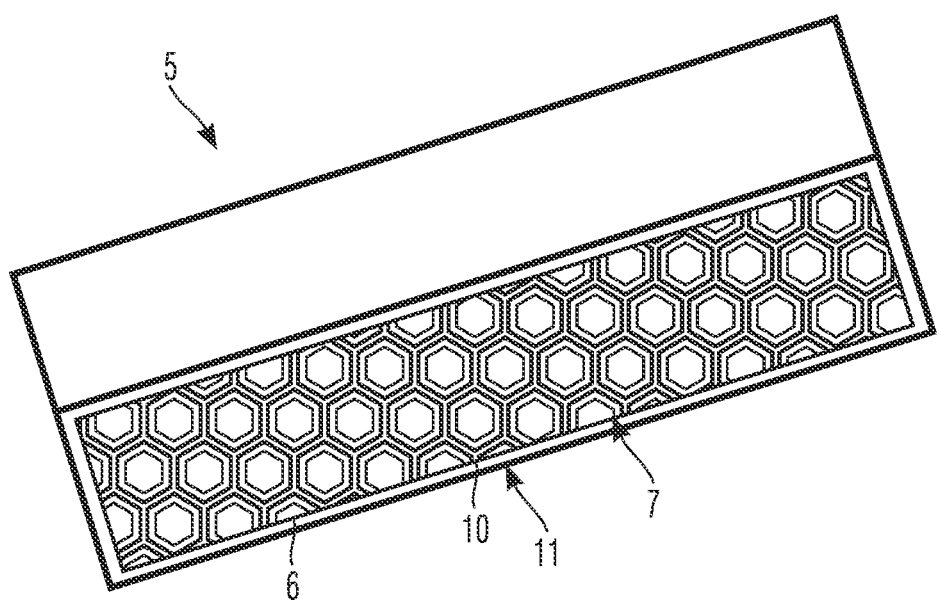
FIG. 1 is a sectional view of a tilting pad with a functional structure located inside.

FIG. 1 shows a sectional view through a tilting pad 5 with a functional structure located inside for forming a support region 6. The support region 6 located inside has a multiplicity of hollow spaces 7 that form a honeycomb-like structure. On an outer surface 10 of the tilting pad 5 the surface 10 is coated with a sliding layer 11. Along its lateral extension, the tilting pad 5 approximately in the middle comprises a transition from the support region 6 located inside to a region in which the tilting pad 5 is formed as solid material. FIG. 3 shows a cross sectional view through a bearing body 3, as indicated by III-III in FIG. 2, with a functional structure located inside for forming a support region 6. The support region 6 located inside has a multiplicity of hollow spaces 7 that form a honeycomb-like structure.

Figure 2:
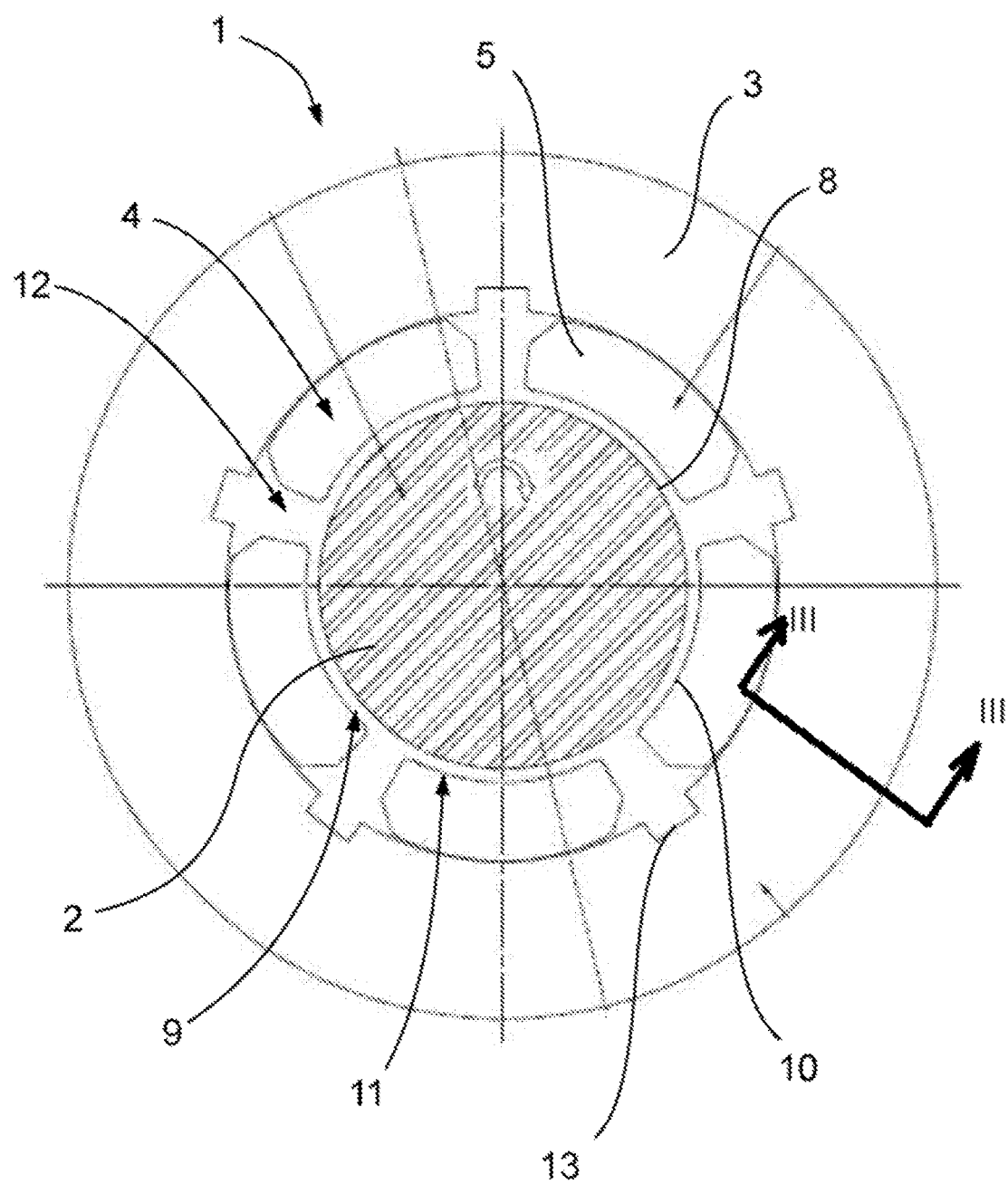
FIG. 2 is as lateral view of a sliding bearing with a tilting pad having a functional structure located inside.
Figure 3:
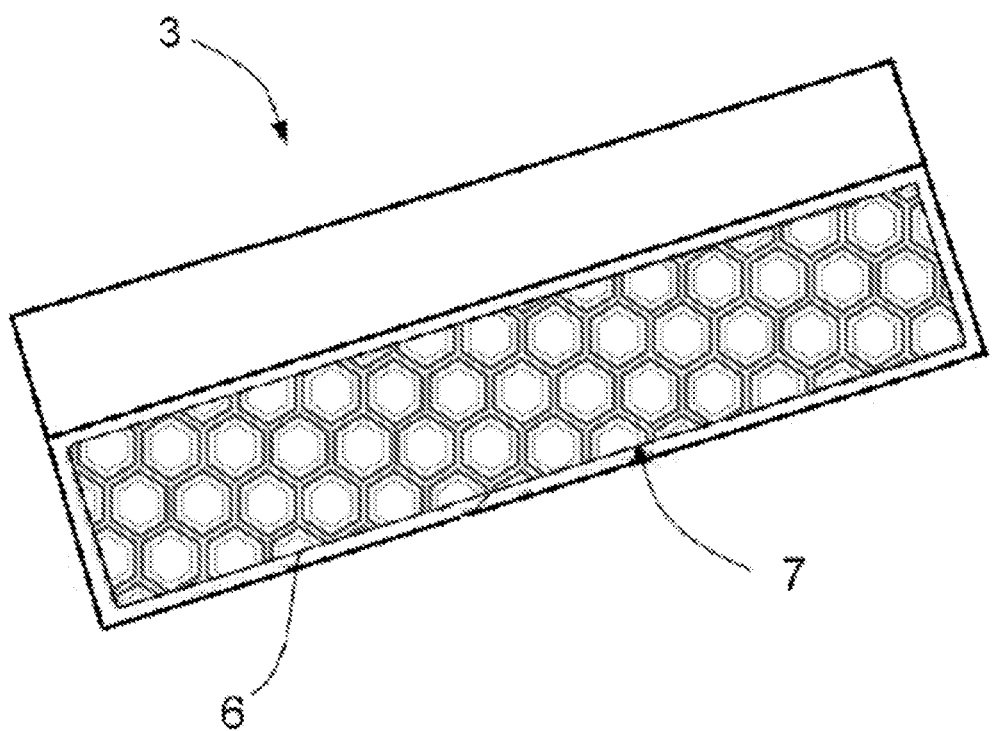
FIG. 3 is a cross sectional view of a bearing body with a functional structure located inside.

In FIG. 2, a lateral view of a sliding bearing 1 with tilting pads 5 having a functional structure 6 located inside is shown. The sliding bearing 1 is mounted on a shaft 2. Furthermore, the sliding bearing 1 comprises a bearing body 3 and a bearing ring 4. The bearing ring 4 consists of five tilting pads 5, which are tiltably mounted on the bearing body 3 and in each case form a lubricated bearing gap 9 with the sliding surface 8 of the shaft 2.

At their respective outer surface 10, the tilting pads 5 of the sliding bearing 1 are coated with a sliding layer 11. The respective outer surface 10, furthermore, forms the lubricated bearing gap 9 with the sliding surface 8 of the shaft 1. In addition, the respective tilting pads 5 that are adjacent to one another form a gap 12 between them. In the region of each gap 12, the bearing body 3 has a recess 13.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sliding bearing for mounting a shaft comprising:
a bearing body;
a bearing ring, which is formed from a multiplicity of tilting pads, wherein each of the multiplicity of tilting pads is tiltably mounted on the bearing body and forms a lubricated bearing gap with a sliding surface of the shaft; and
at least one structure configured for forming a support region, configured as a honeycomb structure with at least one hollow space, located inside the bearing body, wherein the support region provides targeted structural rigidity for the sliding bearing at different regions due to the structure forming the support region,
wherein along a lateral extension, the bearing body approximately in a middle comprises a transition from the support region to a region in which the bearing body is formed as a solid material.

2. The sliding bearing according to claim 1, wherein the support region comprises at least one of:
a multiplicity of hollow spaces, and
a structure that is open to the outside.

3. The sliding bearing according to claim 2, wherein a different material from the at least one support structure forming the support region is introduced into at least one of the hollow spaces or the spaces open to the outside.

4. The sliding bearing according to claim 1, further comprising at least one structure configured for forming a respective support region located inside at least one of the tilting pads, wherein the respective support region provides targeted structural rigidity for the sliding bearing at different regions by varying due to the respective structure forming the support region,
wherein at least one of the multiplicity of tilting pads is at least partly produced by additive manufacturing.

5. The sliding bearing according to claim 1, wherein the bearing body is at least partly produced by additive manufacturing.

6. The sliding bearing according to claim 1, wherein support webs are formed in the support region that extend at least one of longitudinally and transversely.

7. The sliding bearing according to claim 6, wherein the support webs are connected to one another by connecting webs.

8. The sliding bearing according to claim 1, wherein the support region comprises arc-shaped support webs.

9. The sliding bearing according to claim 1, wherein each of the multiplicity of tilting pads are coated with a sliding layer on a respective outer surface, which with the sliding surface of the shaft forms the lubricated bearing gap.

10. The sliding bearing according to claim 1, wherein between adjacent tilting pads a gap is formed configured to conduct a lubricant.

11. The sliding bearing according to claim 1, wherein the bearing damping is based at least in part on a targeted change of a flow resistance through the at least one structure configured for forming the support region.

12. A method for producing a tilting pad for a sliding bearing having a bearing body; a bearing ring, which is formed from a multiplicity of tilting pads, comprising:
tiltably mounting each of the multiplicity of tilting pads on the bearing body to form a lubricated bearing gap with a sliding surface of a shaft, wherein at least one structure configured for forming a support region located inside the bearing body, wherein the support region provides targeted structural rigidity for the sliding bearing;
producing by additive manufacturing the at least one structure configured for forming the support region
wherein the at least one structure configured for forming a support region, is configured as a honeycomb structure with at least one hollow space.

13. The method according to claim 12, wherein a material for the additive manufacturing is one of metal and contains metal proportions.

14. The method according to claim 12, wherein the additive manufacturing is 3-D printing.

* * * * *